June 7, 1949. A. C. DOBRICK 2,472,576
FLUSH VALVE
Filed April 22, 1946 2 Sheets-Sheet 1

Inventor:
August C. Dobrick
By Chritton, Leonard, Wickey & Hofgren
Attorneys

June 7, 1949.  A. C. DOBRICK  2,472,576
FLUSH VALVE
Filed April 22, 1946  2 Sheets-Sheet 2
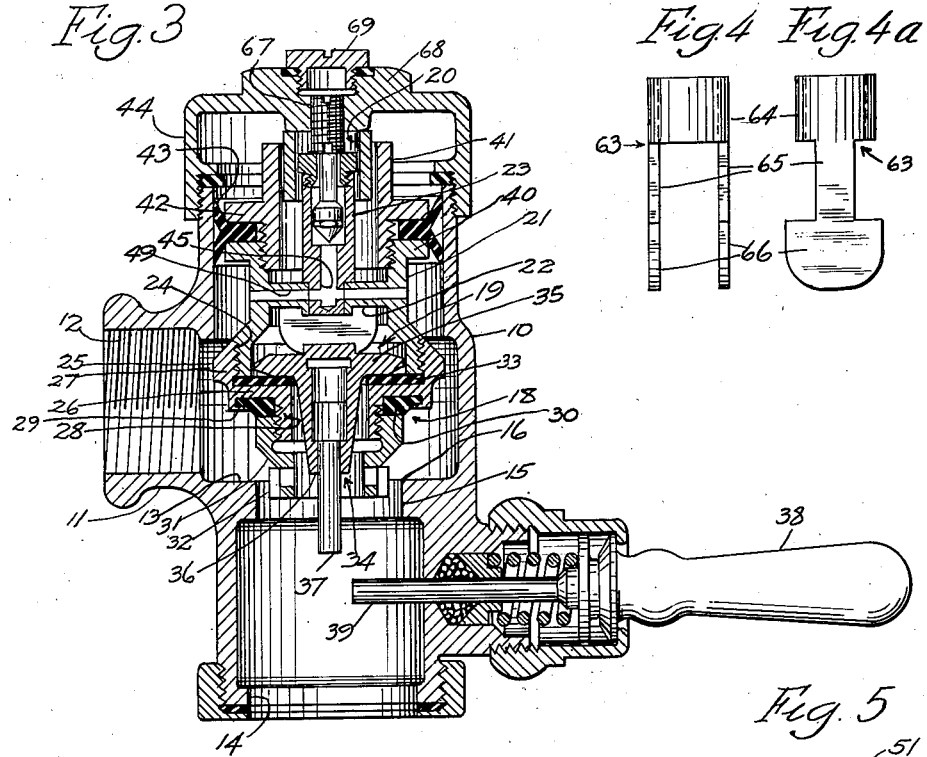
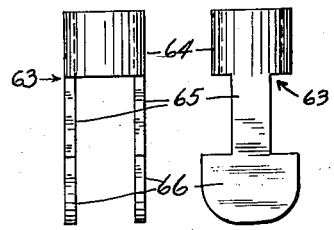
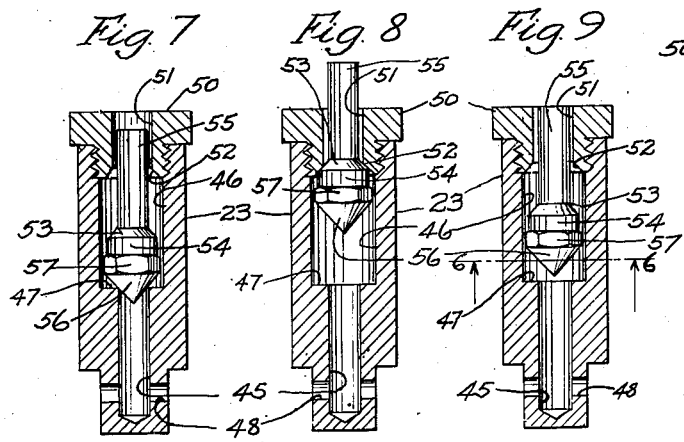
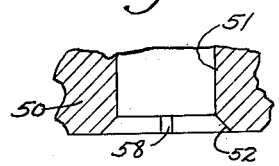
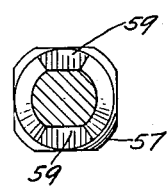
Inventor
August C. Dobrick
By Chritton, Schroeder, Merriam & Hofgren
his Attorneys Patented June 7, 1949

2,472,576

UNITED STATES PATENT OFFICE 2,472,576

FLUSH VALVE

August C. Dobrick, Chicago, Ill., assignor to The Imperial Brass Manufacturing Company, Chicago, Ill., a corporation of Illinois Application April 22, 1946, Serial No. 663,889

5 Claims. (Cl. 137—93)

The invention relates to flush valves and has as a general object to provide a flush valve of new and improved construction.

Another object of the invention is to provide a flush valve having new and improved means for assuring proper operation of the valve, particularly closing of the valve, after a predetermined time interval.

Another object is to provide a flush valve having means coming into play upon complete opening of the valve positively to return the relief valve to seated position to condition the main valve for return to closed position.

Other objects and advantages will become apparent from the following detailed description taken in connection with the accompanying drawings, in which:

Fig. 3 is again a view similar to Fig. 1 showing the valve in fully open position.

Figs. 4 and 4a are detailed views of one of the parts of the valve.

Fig. 5 is an enlarged view of the bleed valve seat.

Fig. 6 is an enlarged view taken approximately along the line 6—6 of Fig. 9.

Figs. 7, 8 and 9 are enlarged detailed views of the bleed valve means in the position shown respectively in Figs. 1, 2 and 3.

Figure 1:
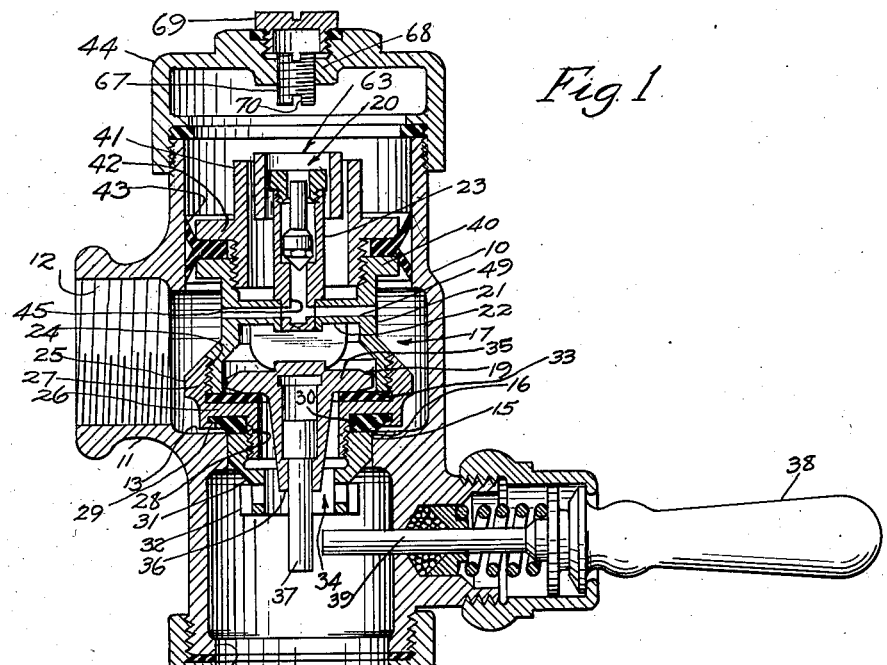
Fig. 1 is a longitudinal sectional view of a flush valve embodying the features of this invention.

While the invention is susceptible of various modifications and alternative constructions, it is here shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

As shown in the drawings for purposes of disclosure, the flush valve comprises an elongated, generally cylindrical body 10 having formed integrally therewith and projecting radially therefrom at about the midpoint of the body 10 an annular projection 11 formed with internal threads 12 for the reception of a fluid supply pipe. Formed in the body 10 coaxially with the projection 11 is an aperture 13 forming with the projection 12 the fluid inlet, the lower end of the body 10, as viewed in Fig. 1, forming the fluid outlet 14. Interposed in the body 10 intermediate the inlet 13 and the outlet 14, herein just below the inlet 13, is an inwardly projecting annular flange 15, the upper edge or corner 16 of which serves as the main valve seat.

Adapted to cooperate with the seat 16 to control the flow of fluid through the valve is a piston unit generally designated 17 functioning in well known manner to open the valve under proper conditions under the influence of the supply fluid and, after a predetermined interval, again to close the valve, this reaction again being by the pressure of the supply fluid. Generally speaking, the piston unit 17 comprises a main valve element 18 (see Fig. 3) for cooperation with the seat 16, motivating means for this main valve element, relief valve means 19 controlling initiation of opening movement of the main valve, and bleed valve means, generally designated 20, for controlling the motivating means in the closing of the main valve. In greater particularity, the piston unit 17 comprises an intermediate or body casting 21, generally tubular in character save for a diametrical bar 22 and a longitudinal and herein upstanding tubular portion 23 serving as a housing for the bleed valve means 20, as will hereinafter be more fully described. At its lower end, as viewed in Fig. 1, the body casting 21 is formed with external threads 24 for the threaded reception of a member 25 adapted to form the main valve element and to carry the seat for the relief valve means. To that end, the member 25 has an annular washer-like portion 26 and extending longitudinally and, as here shown, upwardly from the outer periphery of the portion 26 is an internally threaded flange 27 for threaded engagement with the threads 24, and extending axially in the opposite direction, herein downwardly from the periphery of the washer-like portion 26, is an annular externally threaded flange 28. The flange 28 is of such diameter that it is more than readily receivable within the flange 15 projecting inwardly from the body 10. Also projecting axially downwardly spaced radially outwardly of the flange 28 is a small inturned flange 29. Received between the flange 28 and the flange 29 is an annular ring 30 of rubber or rubber-like composition which makes the actual contact with the main seat 16. Retaining the ring 30 securely in position on the under side of the member 25 is a collar 31 threaded on the flange 28 and carrying a spider portion 32 for cooperation with the flange 15 to guide the piston unit 17 when the valve is in fully open position.

Clamped between the body casting 21 and the member 25 is a seat-forming washer 33 of the auxiliary or relief valve means. As in the case of the ring 30, the washer 33 is of some rubber or rubber-like composition. By the term rubber-like composition is meant any one of the various natural or synthetic resins or plastics or mixtures thereof suitable and developed for uses of this character. Cooperating with the washer 33 is the valve element 34 of the relief valve means. This valve element is of conventional construction having a head 35 adapted to rest on the washer 33 and a downwardly extending stem 36 which has slidably projecting from it a pin 37. Sufficient clearance is provided between the stem 36 and the flange 28 to permit tilting of the relief valve element about a point on its periphery as an incident to movement of the valve actuating handle 38 operating in well known manner through the actuating rod 39.

At its upper end, the casting 21 is threaded internally and has a radially outwardly projecting flange 40. Threaded into the upper end of the casting 21 is a tube 41 which also has formed thereon, at about the middle thereof, a radially outwardly extending flange 42. Between the flanges 40 and 42 there is clamped a piston ring 43, generally Y-shaped in radial cross section, and again composed of some rubber or rubber-like composition. The ring 43 and the flanges 40 and 42 form the piston of the motivating means for opening and closing the main valve, the cylinder being formed by the upper half of the body 10. The upper end of the body 10 is closed by a cap 44 threaded thereon.

The bleed valve means, as already mentioned (Figs. 5–9), includes a tubular portion 23 upstanding from the cross bar 22 and forming a housing for the valve means. The tubular portion at its lower end is formed with an axial bore or passage 45 and at its upper portion with a bore 46 of larger diameter forming between the bores a shoulder 47 serving as a valve seat. The tubular portion 23 has diametrically opposed ports 48 registering with a bore or passage 49 extending through the bar 22 so as to be in constant communication with the incoming fluid. The upper end of the tubular portion 23 has received therein a nut 50 containing an axial passage 51 opening outwardly through the nut. At its inner end, the passage 51 is given a very slight outward flare forming a frusto-conical valve seat 52. Within the tubular portion 23 is a compound valve element 53. This element has a head 54 and an upwardly projecting stem 55 passing with ample clearance through the passage 51 in the nut 50. At the juncture of its head 54 and its stem 55 the valve is given a frusto-conical shape to cooperate with the valve seat 52, while at its tip 56 the valve also is conical for cooperation with the seat 47. Intermediate the conical portions, the valve head is formed with a square flange 57 having rounded corners, the flange serving in well known manner as a guide means for the valve while at the same time permitting flow of fluid past the valve. As best seen in Fig. 5, the conical valve seat 52 is formed with a pair of diametrically opposed small notches 58 which permit a very slight flow of fluid even when the valve is seated on the seat 52. As best seen in Fig. 6, the conical tip 56 is formed on diametrically opposite sides with a flat 59 which serves the same purpose as the notches 58, namely, to permit a slight flow of fluid even when the valve is seated on the seat 47. The various parts of the bleed valve means are so proportioned that when the valve is seated on the seat 52 the stem 55 projects outwardly beyond the nut 50 and so that when the end of the stem is flush with the outer face of the nut 50 the valve is disengaged from both seats.

In the past, restoration of the relief valve element to seated position has been effected through the medium of a spring or through reliance entirely upon fluid pressure. This has never been a very satisfactory arrangement because of the tendency or possibility of the relief valve fluttering, under those conditions, and thus not producing uniform operation. Where the valve is used in the control of salt water or in other fluids having a very highly corrosive action, any spring provided to return the relief valve to closed position is subjected to such corroding action and thus may fail after a comparatively short period of use of the valve. It is a feature of this invention to provide for the positive seating of the relief valve and the total elimination of any spring means acting to seat the relief valve. Herein this means takes the form of an element which comes into play as an incident to opening of the valve to fully open position. More particularly, this element takes the form of a fork or yoke 63 having a cylindrical band 64 at one end and a pair of depending legs 65 (Figs. 4 and 4a) terminating in spade-like feet 66. The band 64 is of a diameter to slide freely over the tubular portion 23 while legs 65 and the feet 66 are sufficiently widely spaced so as to pass over and straddle the bar 22 to come to rest on the upper surface of the head 35 of the relief valve element. The length of the yoke 63 is such that when the relief valve element is seated and the feet of the yoke are bearing thereagainst, the band 64 projects slightly beyond the upper end of the tube 41 (see Fig. 1).

The valve is completed by an adjustable abutment screw 67 which is threaded through the cap 44 to be abutted by the end of the stem 55 of the bleed valve means to unseat that valve when the main valve is in fully open position. Preferably the cap 44 is formed with a boss 68 and carries a cap nut 69 for concealing the adjusting screw 67. Formed in the inner end of the adjusting screw 67 is a diametrical notch 70 to permit flow of fluid out of the bore 51 when the nut 50 abuts the screw 67.

The advantages of the construction disclosed can best be appreciated from a brief description of the operation of the valve. Let it be assumed, therefore, that the valve is closed as shown in Fig. 1. This means that not only is the main valve element seated on its seat 16 but the relief valve element 35 is seated and the bleed valve element 53 is seated on the seat 47. The valve body 10 above the piston-forming means is filled with fluid under the same pressure as the fluid being supplied to the valve. This is assured despite the fact that the bleed valve element 53 is resting on its seat 47 for there is an opportunity for equalization of pressures on opposite sides of the piston-forming means because of the provision of the flats 59 which maintain constant communication between the inlet of the valve and the top portion of the valve body. As a result, any momentary changes in pressure due to actuation of some other valve connected to the same line or source of supply will not serve to unseat the valve.

Figure 2:
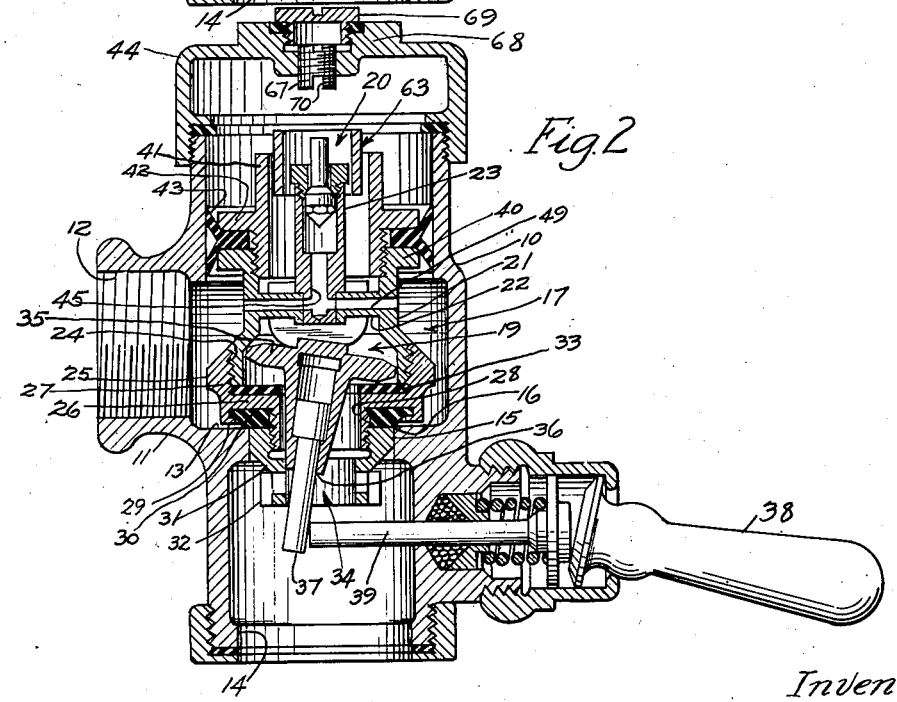
Fig. 2 is a view similar to Fig. 1 showing the position of certain parts of the valve immediately after movement of the valve actuating handle and before opening of the main valve.

Let is be assumed next that the actuator 38 for the valve is moved and, moreover, that this movement has just occurred. The various parts of the valve will then be in the position shown in Fig. 2. The relief valve 35 will be tilted to open position, thereby permitting the fluid trapped in the body 10 above the piston unit 17 to flow out through the passage provided by the flange 28. With such relief of this fluid, a pressure differential will, of course, be set up. As a result, there will be attempt at increased flow of fluid from the inlet 13 through the passage 49 and the bleed valve means. However, such flow of fluid upwardly through the bores 45 and 46 will lift the valve element 53 and seat it on the seat 52. Thus, the flow through the bleed valve will then be limited to the very small amount that can pass through the notches 58. Also resulting from this opening of the relief valve and the pressure differential accompanying it will be an opening of the main valve through upward movement of the piston unit 17. Because of the pressure differential, the higher pressure of the incoming fluid, though acting on the smaller effective pressure area, will be able to raise the piston unit 17 to the limit of its movement in an opening direction.

The limit of this movement is herein determined by abutment of the yoke 63 with the cap 44. This limit of movement of the piston unit, that is, the fully open position of the valve, is shown in Fig. 3. It will readily be apparent from the foregoing description and from a consideration of the drawings that, as the piston unit 17 approached the fully open position of the main valve means 18, the top of the yoke 63 abutted the cap 44 and thus, through engagement of its feet 66 with the valve element 35, positively forced the valve element to seated position. Under these circumstances, not even the force of the water flowing through the valve and impinging against the pin 37 can serve even momentarily to tilt the valve 35. In the movement of the piston unit upwardly, the stem 55 of the bleed valve 53 struck the adjusting screw 67 and thus the valve 53 was forced to a position intermediate the two valve seats 47 and 52 so that full rate of flow through the bleed valve means was established. As the space above the piston unit fills up with fluid, that fluid, being now at the same pressure as the supply fluid, is able, because it is acting on a larger effective area, to force the piston unit gradually downwardly toward closed position of the main valve, as shown in Fig. 1. As the piston unit moves downwardly a sufficient distance, engagement of the valve stem 55 with the adjusting screw 67 is, of course, broken thereby permitting the valve element 53 again to seat on the seat 52. From that time forward, of course, the closing of the valve will be slower because of the restricted flow of fluid to the body of the valve above the piston unit.

With this positive seating of the relief valve 35, the length of time that the valve remains open will always be uniform because there will not be any fluttering of the valve element 35 as in the prior constructions and hence no loss of fluid which must first be replaced before the main valve means can start to close. The means by which this positive seating of the relief valve is accomplished is of simple construction, quickly and readily formed from a piece of brass or bronze tubing by a few simple cutting and forming operations. Assembly of the valve is facilitated and in other respects the employment of the yoke 63 not only improves the operation of the valve but results in a more readily manufactured valve.

I claim as my invention:

1. A flush valve comprising, in combination, a body having an inlet and an outlet for the fluid to be controlled, means within the body forming a main valve seat, a piston unit reciprocable in said body under the influence of fluid pressure differentials including a main valve element for cooperation with said main valve seat and relief valve means including a valve element controlling a passage leading from the end of said piston unit remote from said main valve element to the outlet of said body, and a rigid yoke-like element supported by said relief valve element and operable as an incident to movement of said piston unit to fully open position of said main valve to abut a portion of said body and positively to seat said relief valve element.

2. A flush valve comprising, in combination, an elongated generally cylindrical body having an inlet intermediate the ends of said body, a discharge outlet at one end and a closure at the other end, means within the body forming an annular main valve seat intermediate the inlet and the outlet of said body, a piston unit reciprocable in said body under the influence of fluid pressure differentials including a main valve element for cooperation with said main valve seat, means for supplying fluid from the inlet to the closed end of said body including a diametrical bar in said piston unit having a passage therein communicating at one end with the inlet of said body and at the other end with the closed end of said body and relief valve means including a tiltable valve element controlling a passage leading from the closed end of said body, and a rigid bifurcated element adapted to straddle said bar and rest on said tiltable relief valve element, said bifurcated element upon movement of said piston unit to fully open position of said main valve abutting said closure and positively seating said relief valve element.

3. In a flush valve having a body with an inlet and an outlet, means within the body forming a main valve seat, a piston unit reciprocable in said body under the influence of fluid pressure differentials including a main valve element at one end for cooperation with said main valve seat, relief valve means including a tiltable valve element controlling a passage leading from the end of said piston unit opposite said main valve element to the outlet of said body, a diametrical bar and an axially extending tubular portion, said bar and said tubular portion having a passage formed therein for effecting communication between the inlet and the end of said piston unit opposite said main valve element, and rigid means for positively seating said relief valve element as an incident to movement of said piston unit to fully open position of said main valve comprising a band loosely surrounding said tubular portion and having a pair of bifurcations extending therefrom and adapted to straddle said bar and bear against said relief valve element, said rigid means in the seated position of said relief valve element projecting axially beyond said piston unit.

4. A flush valve comprising, in combination, a body having an inlet and an outlet for the fluid to be controlled, means within the body forming a main valve seat, a longitudinally movable piston unit reciprocable in said body under the influence of fluid pressure differentials and being in sealing relationship with said body, said piston unit including a first valve element for seating on said main valve seat and relief valve means located within the piston unit and movable therewith including a second valve element for controlling a passage leading from the end of said piston unit opposite said main valve seat to said outlet of the body, and an elongated rigid element having one end resting loosely on said second valve element and projecting at the other end around a portion of said piston unit to a point beyond said unit with said other end normally being adjacent to but spaced from a portion of said body, said elongated element being operable as an incident to movement of said piston unit to fully open position of the main valve to abut against said body portion and positively close said relief valve means.

5. A flush valve comprising, in combination, a body having an inlet and an outlet for the fluid to be controlled, means within the body forming a main valve seat, a longitudinally movable piston unit reciprocable in said body under the influence of fluid pressure differentials and being in sealing relationship with said body, said piston unit including a first valve element for seating on said main valve seat and relief valve means located within the piston unit and movable therewith including a tiltable second valve element for controlling a passage leading from the end of said piston unit opposite said main valve seat to said outlet of the body, and an elongated rigid element having one end resting loosely on said tiltable second valve element and projecting at the other end around a portion of said piston unit to a point beyond said unit with said other end normally being adjacent to but spaced from an abutment member, said elongated element being operable as an incident to movement of said piston unit to fully open position of the main valve to abut against said abutment member and positively close said relief valve means.

AUGUST C. DOBRICK.

REFERENCES CITED

The following references are of record in the file of this patent:

UNITED STATES PATENTS

| Number | Name | Date |
|---|---|---|
| 1,539,455 | Young | May 26, 1925 |
| 1,868,520 | Brooks | July 26, 1932 |
| 1,878,001 | Sloan | Sept. 20, 1932 |
| 2,007,652 | Kocour | July 9, 1935 |

FOREIGN PATENTS

| Number | Country | Date |
|---|---|---|
| 57,509 | Sweden | Sept. 16, 1924 |